United States Patent
Deschamps

(10) Patent No.: US 9,858,773 B2
(45) Date of Patent: Jan. 2, 2018

(54) WEARABLE COMPUTER HAVING A SKIN-STIMULATING INTERFACE

(71) Applicant: Microsoft Technology Licensing, LLC, Redmond, WA (US)

(72) Inventor: Daniel Guilherme Paixao Deschamps, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 14/183,664

(22) Filed: Feb. 19, 2014

(65) Prior Publication Data

US 2015/0235529 A1    Aug. 20, 2015

(51) Int. Cl.
  *G08B 23/00* (2006.01)
  *G08B 6/00* (2006.01)
  *G08B 21/18* (2006.01)
  *H04M 3/42* (2006.01)

(52) U.S. Cl.
  CPC ............ *G08B 6/00* (2013.01); *G08B 21/182* (2013.01); *H04M 3/42051* (2013.01)

(58) Field of Classification Search
  None
  See application file for complete search history.

(56) References Cited

U.S. PATENT DOCUMENTS

| | | | |
|---|---|---|---|
| 4,913,148 A | 4/1990 | Diethelm | |
| 4,926,879 A * | 5/1990 | Sevrain | G08B 6/00 340/407.1 |
| 5,357,696 A | 10/1994 | Gray et al. | |
| 5,663,703 A * | 9/1997 | Pearlman | G08B 6/00 340/407.1 |
| 5,719,561 A * | 2/1998 | Gonzales | G09B 21/003 340/4.12 |
| 6,218,958 B1 | 4/2001 | Eichstaedt et al. | |
| 6,326,901 B1 * | 12/2001 | Gonzales | G08B 6/00 340/4.12 |
| 6,963,762 B2 | 11/2005 | Kaaresoja et al. | |
| 7,173,881 B1 * | 2/2007 | Freudenberg, Jr. | G04F 10/00 340/540 |
| 8,170,656 B2 | 5/2012 | Tan et al. | |
| 8,184,070 B1 | 5/2012 | Taubman | |
| 2002/0068961 A1 | 6/2002 | Fischer et al. | |
| 2002/0170193 A1 | 11/2002 | Townsend et al. | |
| 2002/0177471 A1 * | 11/2002 | Kaaresoja | G08B 6/00 455/567 |
| 2003/0227374 A1 | 12/2003 | Ling et al. | |
| 2007/0016425 A1 | 1/2007 | Ward | |
| 2008/0021519 A1 * | 1/2008 | De Geest | G08B 21/24 607/58 |
| 2009/0072955 A1 * | 3/2009 | Cary | G08B 6/00 340/407.1 |
| 2009/0174671 A1 | 7/2009 | Tachi et al. | |
| 2009/0192406 A1 | 7/2009 | Larsen et al. | |
| 2010/0113965 A1 * | 5/2010 | Kanevsky | A61B 5/0531 600/547 |
| 2010/0152794 A1 | 6/2010 | Radivojevic et al. | |
| 2010/0238005 A1 * | 9/2010 | White | G08B 6/00 340/407.2 |
| 2011/0087300 A1 * | 4/2011 | Van Den Eerenbeemd | A63F 13/28 607/2 |
| 2011/0128151 A1 | 6/2011 | Asad et al. | |
| 2013/0085538 A1 | 4/2013 | Volpe et al. | |
| 2013/0120265 A1 | 5/2013 | Horii et al. | |
| 2014/0045463 A1 | 2/2014 | Hsieh et al. | |
| 2014/0180582 A1 * | 6/2014 | Pontarelli | G08B 6/00 701/494 |
| 2014/0267648 A1 * | 9/2014 | Wexler | G09B 21/006 348/62 |
| 2015/0009784 A1 * | 1/2015 | Cho | G04G 21/08 368/224 |
| 2015/0110277 A1 * | 4/2015 | Pidgeon | H04R 3/00 381/56 |
| 2015/0123775 A1 * | 5/2015 | Kerdemelidis | G08B 6/00 340/407.1 |

(Continued)

FOREIGN PATENT DOCUMENTS

| | | |
|---|---|---|
| DE | 263366 A1 | 12/1988 |
| WO | 9310828 A1 | 6/1993 |
| WO | 2009112281 A1 | 9/2009 |
| WO | 2011/117862 A2 | 9/2011 |

OTHER PUBLICATIONS

Gemperle, et al., "Wearable Vibro-tactile Display", Published on: May 1, 2003, Available at: http://www.ices.cmu.edu/reports/040403.pdf, 32 pages.

Scott, et al., "e-Skin: Research into Wearable Interfaces, Corss-Modal Perception and Communication for the Visually Impaired on the Mediated Stage", In Proceedings of ArtAbilltation, Sep. 19, 2006, 13 pages.

Connor, Steve, "How Computers will Soon Get under Our Skin", Published on: Aug. 12, 2011, Available at: http://www.independent.co.uk/news/science/how-computers-will-soon-get-under-our-skin-2336246.html, 15 pages.

(Continued)

*Primary Examiner* — Julie Lieu
(74) *Attorney, Agent, or Firm* — Wade IP Law LLC

(57) ABSTRACT

Techniques are described herein that are capable of providing electrical stimuli to skin of a user to convey information to the user. For instance, the electrical stimuli may inform the user of an event, a condition, etc. Examples of an event include but are not limited to receipt of a message (e.g., an email, an instant message (IM), a short message service (SMS) message, or a transcribed voicemail), receipt of an alarm (e.g., an alarm clock alarm or a warning), receipt of a phone call, occurrence of a time of day, etc. The electrical stimuli may inform the user of a condition of clothing that is worn by the user. The electrical stimuli may inform the user that a physical positioning of the user is to be changed.

20 Claims, 9 Drawing Sheets

(56) References Cited

U.S. PATENT DOCUMENTS

| | | | | |
|---|---|---|---|---|
| 2015/0145659 A1* | 5/2015 | Ishigami | .................. | G08B 6/00 340/435 |
| 2015/0199886 A1* | 7/2015 | De Geest | ............... | G08B 21/24 340/407.1 |
| 2015/0364018 A1* | 12/2015 | Mirov | .................. | G08B 25/016 340/407.1 |

OTHER PUBLICATIONS

Israr et al., "Tactile Brush: Drawing on Skin with a Tactile Grid Display", In Proceedings of SIGCHI Conference on Human Factors in Computing Systems, May 7, 2011, 10 pages.

Crabtree, et al., "Wearable Computing and the Rememberance Agent", In BT Technology Journal, vol. 16, Issue 3, Jul. 1998, 7 pages.

"Your Tongue Can See, Blind Man Gains Freedom Through His Tongue", Published on: Sep. 6, 2006. Available at: http://abcnews.go.com/Primetime/story?id=2401551&page=1#.UagSUiXn9UY, 2 pages.

"International Search Report and Written Opinion Issued in PCT Application No. PCT/US2015/015297", dated Aug. 7, 2015, 19 Pages.

"International Preliminary Report on Patentability Issued in PCT Application No. PCT/US2015/015297", dated Jul. 1, 2016, 18 Pages.

"Second Written Opinion Issued in PCT Application No. PCT/US2015/015297", dated Apr. 7, 2016, 15 Pages.

* cited by examiner

WEARABLE COMPUTER HAVING A SKIN-STIMULATING INTERFACE

BACKGROUND

People are increasingly exposed to information these days, often through mobile devices such as portable digital assistants (PDAs). A snapshot of our modern society is likely to reveal many people using mobile devices while performing their daily routine tasks. For instance, people often text, conduct telephone calls, check messages, search the Internet, etc. while performing activities such as walking down the street, driving in their cars, eating in a restaurant, attending meetings, etc. Using mobile devices in such a manner may raise any of a variety of concerns, namely safety and/or etiquette.

In an effort to address such concerns, companies are developing devices that are capable of delivering content to users in an unobtrusive and/or hands-free manner. For example, Google Inc. has developed Google Glass®, which is a wearable computer that provides an optical head-mounted display (OHMD). Google Glass® enables a user to communicate with the Internet using natural language voice commands. In another example, Motorola Mobility Inc. has developed the H19txt Bluetooth® headset, which reads text messages that are received by a mobile device to a user who wears the headset. For instance, the headset may enable the user to receive the text messages automatically without picking up the mobile device.

However, such devices may not be effective and/or socially accepted in some environments. For instance, critics have raised concerns that Google Glass® may be used to invade the privacy of others, for example, by recording people without their consent. Moreover, Google Glass® may not operate effectively in a brightly lit environment. The effectiveness of some devices, such as the Motorola H19txt Bluetooth® headset, may be substantially compromised in noisy environments. Other devices may use tactile communication techniques in an effort to avoid such issues. However, even those devices may be relatively ineffective in some environments, such as environments that involve substantial motion (e.g., vibration). For instance, a construction worker who is operating a jackhammer likely will not feel tactile signals from such a device due to the vibration of the jack hammer.

SUMMARY

Various approaches are described herein for, among other things, providing electrical stimuli to skin of a user to convey information to the user. For instance, the electrical stimuli may inform the user of an event, a condition, etc. Examples of an event include but are not limited to receipt of a message (e.g., an email, an instant message (IM), a short message service (SMS) message, or a transcribed voicemail), receipt of an alarm (e.g., an alarm clock alarm or a warning), receipt of a phone call, occurrence of a time of day, etc. The electrical stimuli may inform the user of a condition of clothing that is worn by the user. The electrical stimuli may inform the user that a physical positioning of the user is to be changed.

Example systems are described. A first example system includes a mobile device and a stimulus circuit that is in contact with skin of a user. The mobile device is configured to determine whether an event occurs. The mobile device is further configured to generate a notification signal that indicates occurrence of the event in response to a determination that the event occurs. The stimulus circuit is configured to provide one or more electrical stimuli to the skin based on the notification signal to inform the user of the occurrence of the event.

A second example system includes a sensor and a power generation circuit. The sensor is incorporated into clothing that is worn by a person and is in contact with skin of the person. The sensor is configured to detect a physical positioning of the person. The power generation circuit is configured to provide one or more electrical stimuli to the skin of the person via the sensor in response to detecting the physical positioning. The one or more electrical stimuli indicate to the person that the physical positioning is to be changed.

A third example system includes a sensor and a power generation circuit. The sensor is incorporated into clothing that is worn by a person and is in contact with skin of the person. The sensor is configured to detect a condition of the clothing. The power generation circuit is configured to provide one or more electrical stimuli to the skin of the person via the sensor in response to detecting the condition of the clothing. The one or more electrical stimuli indicate the condition of the clothing to the person.

Example methods are also described. In a first example method, a determination is made by a mobile device that an event occurs. A notification signal is generated by the mobile device, indicating occurrence of the event in response to a determination that the event occurs. One or more electrical stimuli are provided to skin of a user, by a stimulus circuit that is in contact with the skin of the user, based on the notification signal to inform the user of the occurrence of the event.

In a second example method, a physical positioning of a person is detected by a sensor that is incorporated into clothing that is worn by the person and that is in contact with skin of the person. In accordance with this method, one or more electrical stimuli are provided to the skin of the person via the sensor in response to detecting the physical positioning. The one or more electrical stimuli indicate to the person that the physical positioning is to be changed.

In a third example method, a condition of clothing is detected by a sensor that is incorporated into the clothing and that is in contact with skin of a person who is wearing the clothing. In accordance with this method, one or more electrical stimuli are provided to the skin of the person via the sensor in response to detecting the condition of the clothing. The one or more electrical stimuli indicate the condition of the clothing to the person.

Example computer program products are also described. A first computer program product includes a computer-readable medium having computer program logic recorded thereon for enabling a processor-based system that is incorporated into clothing to indicate a condition of the clothing. The computer program logic includes a first program logic module and a second program logic module. The first program logic module is for enabling the processor-based system to detect the condition of the clothing via a sensor that is in contact with skin of a person who is wearing the clothing and that is included in the processor-based system which is incorporated into the clothing. The second program logic module is for enabling the processor-based system to provide one or more electrical stimuli to the skin of the person via the sensor in response to detection of the condition of the clothing. The one or more electrical stimuli indicate the condition of the clothing to the person.

A second computer program product includes a computer-readable medium having computer program logic recorded thereon for enabling a processor-based system that is incorporated into clothing to indicate that a physical positioning of a person who is wearing the clothing is to be changed. The computer program logic includes a first program logic module and a second program logic module. The first program logic module is for enabling the processor-based system to detect the physical positioning of the person via a sensor that is included in the processor-based system, which is incorporated into the clothing, and that is in contact with skin of the person. The second program logic module is for enabling the processor-based system to provide one or more electrical stimuli to the skin of the person via the sensor in response to detection of the physical positioning. The one or more electrical stimuli indicate to the person that the physical positioning is to be changed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example system in accordance with an embodiment.

FIGS. 2, 7, and 9 are block diagrams of example implementations of a stimulus circuit shown in FIG. 1 in accordance with an embodiment.

FIGS. 3 and 4 depict example uses of a stimulus circuit shown in FIG. 1 in accordance with embodiments.

FIGS. 5, 6, and 8 depict flowcharts of example methods for providing electrical stimuli to skin of a user to convey information to the user in accordance with embodiments.

Figure 1:
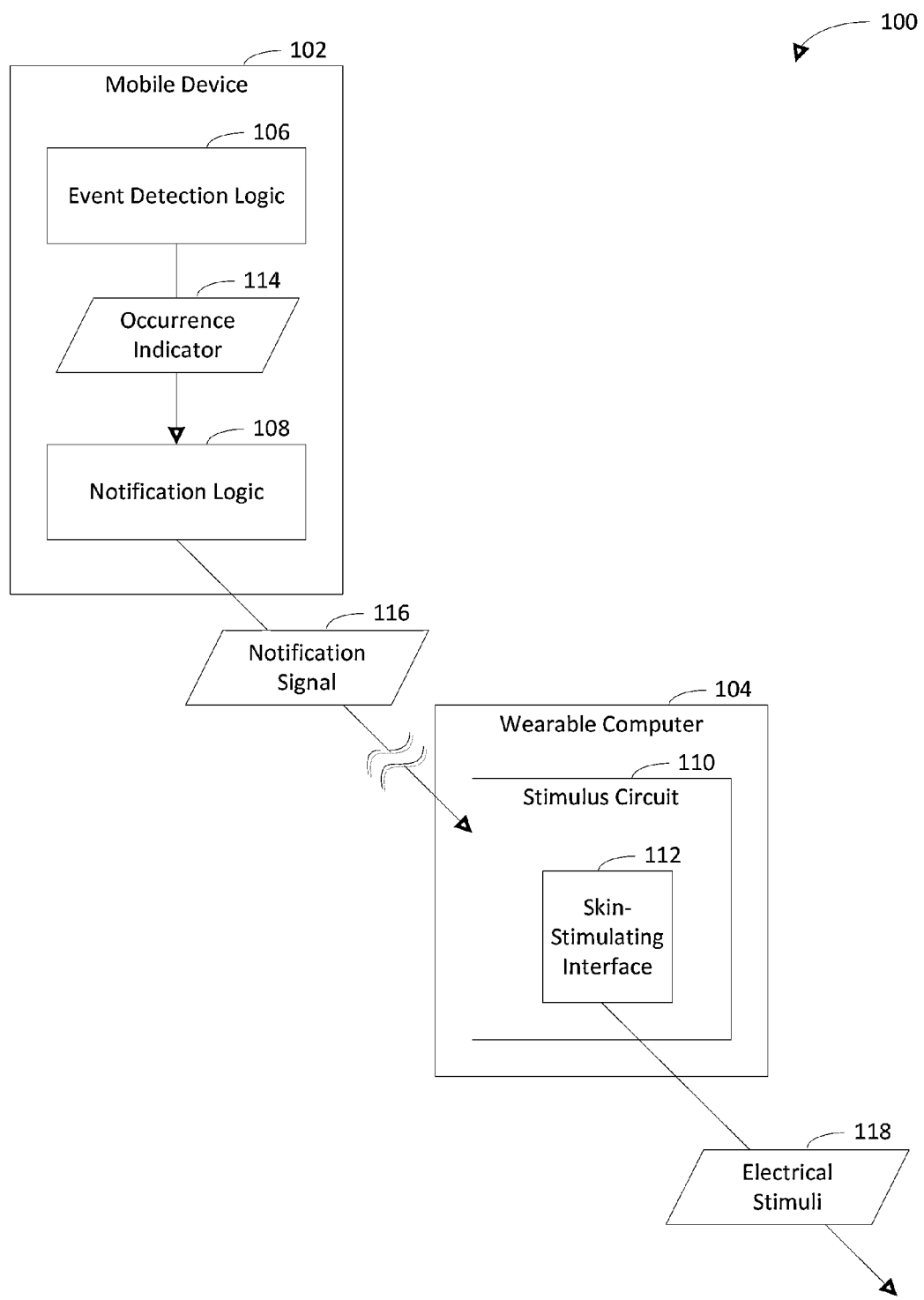

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of providing electrical stimuli to skin of a user to convey information to the user. For instance, the electrical stimuli may inform the user of an event, a condition, etc. Examples of an event include but are not limited to receipt of a message (e.g., an email, an instant message (IM), a short message service (SMS) message, or a transcribed voicemail), receipt of an alarm (e.g., an alarm clock alarm or a warning), receipt of a phone call, occurrence of a time of day, etc. The electrical stimuli may inform the user of a condition of clothing that is worn by the user. The electrical stimuli may inform the user that a physical positioning of the user is to be changed.

Example techniques described herein have a variety of benefits as compared to conventional techniques for conveying information. For instance, the example techniques may be capable of conveying information to a user without the user needing to see, hear, or detect motion (e.g., vibration). The example techniques may convey the information to the user without other people being able to detect that the information is being conveyed to the user. For instance, the example techniques may enable the user to "read" (i.e., receive content of) a text message or an email privately in a setting in which reading a text message or an email is traditionally deemed inappropriate.

The example techniques may be capable of addressing safety, etiquette, and/or privacy concerns associated with conventional techniques. The example techniques may be capable of conveying information in an unobtrusive and/or hands-free manner without interfering with a user's field of vision. The example techniques may remain effective in environments that involve substantial noise, motion and/or light.

FIG. 1 is a block diagram of an example system 100 in accordance with an embodiment. Generally speaking, system 100 operates to provide electrical stimuli to skin of a user to convey information to the user. Detail regarding techniques for providing electrical stimuli to skin of a user is provided in the following discussion.

As shown in FIG. 1, system 100 includes a mobile device 102 and a wearable computer 104. Mobile device 102 may be owned by or otherwise accessible to the user. Wearable computer 104 may be in contact with the skin of the user. Communication between mobile device 102 and wearable computer 104 is carried out using one or more well-known wireless communication protocols, such as Bluetooth® or ZigBee®. For instance, such communication may be carried out over a network, such as a personal area network (PAN), a wide-area network (e.g., the Internet), a local area network (LAN), another type of network, or a combination thereof.

Mobile device 102 is a processing system that is capable of communicating with wearable computer 104. Mobile device 102 may communicate with wearable computer 104 uni-directionally (i.e., providing communications to wearable computer 104, but not receiving communications from wearable computer 104) or bi-directionally (i.e., providing communications to wearable computer 104, and receiving communications from wearable computer 104). An example of a processing system is a system that includes at least one processor that is capable of manipulating data in accordance with a set of instructions. For instance, a processing system may be a laptop computer, a tablet computer, a personal digital assistant, a cellular telephone, etc. Mobile device 102 is configured to provide a notification signal 116 to wearable computer 104 for causing wearable computer 104 to provide one or more corresponding electrical stimuli 118 to the skin of the user.

Mobile device 102 includes event detection logic 106 and notification logic 108. Event detection logic 106 is configured to determine whether an event occurs. The occurrence of the event may include receiving a text-based message, a voicemail, and/or a phone call at mobile device 102. For instance, a text-based message may be an email, an instant message (IM), a short message service (SMS) message, a transcribed voicemail, etc.

For example, event detection logic 106 may be configured to determine whether an event with regard to application (e.g., software program application) occurs. Such application may execute on mobile device 102 or on a remote server with which mobile device 102 communicates. In accordance with this example, detection logic 106 may communicate with the application to determine whether the notification signal 116 is to be provided to wearable computer 104. Examples of an application include but are not limited to an email application (e.g., Outlook®, which was developed by Microsoft Corporation; Gmail®, which was developed by Google Inc.; or Yahoo!® Mail, which was developed by Yahoo Inc.), an instant messaging application (e.g., Windows Messenger™, which was developed by Microsoft Corporation; or Yahoo! Messenger™, which was developed by Yahoo Inc.), a short message service (SMS) application, a voicemail application, a clock application, etc. Upon determining that the event occurs, event detection logic 106 generates an occurrence indicator 114, which indicates that the event has occurred.

Notification logic 108 is configured to generate the notification signal 116. For instance, notification logic 108 may generate the notification signal 116 based on receipt of the occurrence indicator 114.

Wearable computer 104 is a processing system that is configured to provide one or more electrical stimuli 118 based on the notification signal 116, which is received from mobile device 102. Wearable computer 104 may be capable of providing communications to mobile device 102 (e.g., responding to the notification signal 116), though the scope of the example embodiments is not limited in this respect. Wearable computer 104 is configured to provide one or more electrical stimuli 118 to the skin of the user based on the notification signal 116 to inform the user of the occurrence of the event.

Wearable computer 104 includes a stimulus circuit 110, which is configured to generate the one or more electrical stimuli 118. Stimulus circuit 110 includes skin-stimulating interface 112 via which the one or more electrical stimuli 118 are provided to the skin of the user. Details regarding example configurations of stimulus circuit 110 and skin-stimulating interface 112 are described below with reference to FIGS. 2-12.

Figure 2:
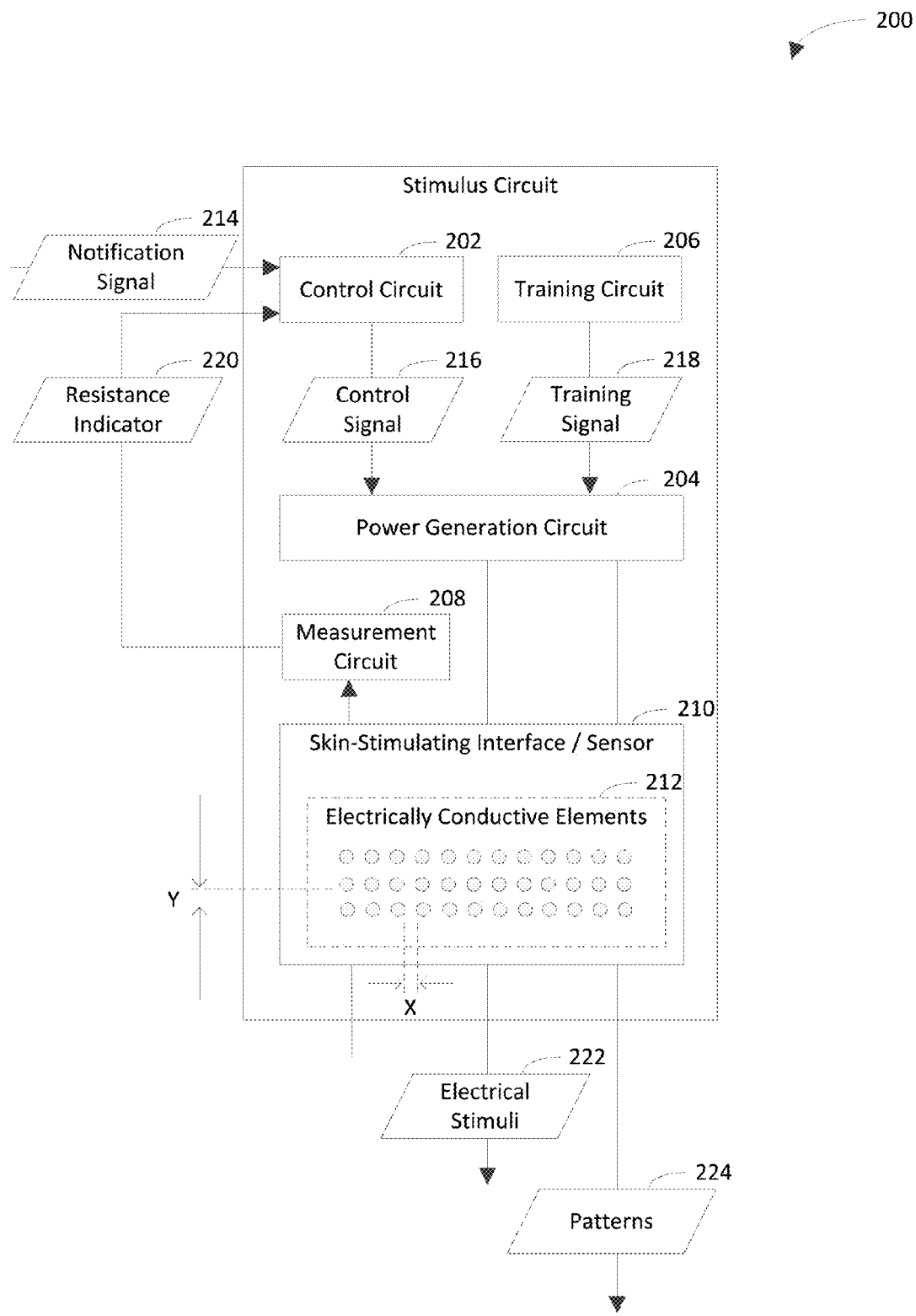

FIG. 2 is a block diagram of a stimulus circuit 200, which is an example implementation of stimulus circuit 110 shown in FIG. 1, in accordance with an embodiment. As shown in FIG. 2, stimulus circuit 200 includes a control circuit 202, a power generation circuit 204, a training circuit 206, a measurement circuit 208, and a skin-stimulating interface 210. Skin-stimulating interface 210 has sensor functionality and is therefore also referred to as a sensor. Skin-stimulating interface 210 is shown to include a plurality of electrically conductive elements 212, though the scope of the example embodiments is not limited in this respect.

Control circuit 202 is configured to generate a control signal 216 that specifies one or more electrically conductive elements which are selected from the plurality of electrically conductive elements 212 based on the notification signal 214. For example, control circuit 202 may have access to a list of attributes that may be associated with the notification signal 214, a list of subsets of the plurality of electrically conductive elements 212, a map that maps one or more of the attributes to each subset, and a list of one or more characteristics that correspond to each subset. In accordance with this example, control circuit 202 may use the map to match one or more attributes of the notification signal 214 to a designated subset from the list of subsets. Control circuit 202 may generate the control signal 216 to have the one or more characteristics (e.g., magnitude, frequency, phase, etc.) that correspond to the designated subset.

Control circuit 202 may generate the control signal 216 to specify a magnitude (a.k.a. amplitude) of one or more electrical stimuli 222 which are to be provided via the one or more electrically conductive elements which are selected from the plurality of electrically conductive elements 212. For instance, control circuit 202 may determine the magnitude based on a resistance indicator 220, which is discussed in further detail below with reference to measurement circuit 208. The magnitude may be measured in volts. For instance, the magnitude of the one or more electrical stimuli 222 may be any suitable voltage, such as 200 V, 160 V, 130V, 110 V, 95 V, 85 V, 80V, and so on. The one or more electrical stimuli 222 may have no amperage, or the amperage may be negligible. The one or more electrical stimuli 222 may have refresh rate, which may be any suitable frequency, such as 1.5 kiloHertz (kHz), 1.3 kHz, 1.1 kHz, 1.0 kHz, and so on.

Power generation circuit 204 is configured to generate one or more electrical stimuli 222. Power generation circuit 204 is configured to provide the one or more electrical stimuli 222 via the one or more respective electrically conductive elements, which were selected from the plurality of electrically conductive elements 212, based on the control signal 216. If the control signal 216 specifies the magnitude of the one or more electrical stimuli 222, power generation circuit 204 may generate the one or more electrical stimuli 222 to have the magnitude that is specified by the control signal 216.

Power generation circuit 204 may be configured to adapt a magnitude of the one or more electrical stimuli 222 based on an electrical resistance of the skin of the user, though the scope of the example embodiments is not limited in this respect. For instance, power generation circuit 204 may adapt the magnitude of the one or more electrical stimuli 222 in response to receiving the control signal 216 that specifies a magnitude that is based on the electrical resistance of the skin of the user.

Measurement circuit 208 is configured to detect the electrical resistance of the skin of the user. For example, measurement circuit 208 may detect a current that results from the one or more electrical stimuli 222 being provided to the skin of the user. For instance, the current may be detectable for an amount of time following the provision of the one or more electrical stimuli 222 to the skin. The amount of time varies depending on a variety of factors. In one aspect, the amount of time may be in a range of 100-200 milliseconds (ms). In accordance with this example, measurement circuit 208 may divide a voltage of the electrical stimuli 222 by the current to determine the electrical resistance of the skin. Measurement circuit 208 generates a resistance indicator 220, which indicates the electrical resistance of the skin. For instance, the resistance indicator 220 may include a numerical value that corresponds to the electrical resistance. Accordingly, a relatively greater numerical value may correspond to a relatively greater electrical resistance, and a relatively lesser numerical value may correspond to a relatively lesser electrical resistance.

It should be noted that the electrical resistance of the skin may be associated with an amount of pressure that is applied to the skin. For instance, as the amount of pressure that is applied to the skin increases, the electrical resistance of the skin decreases. As the amount of pressure that is applied to the skin decreases, the electrical resistance of the skin increases.

Training circuit 206 is configured to perform a training operation during which the training circuit 206 controls the power generation circuit 204 to provide patterns 224 (e.g., a series of patterns) of electrical stimuli to the skin of the user to train the user to distinguish between the patterns 224. For instance, training circuit 206 may generate training signal 218, which indicates the patterns 224. Training circuit 206 may provide the training signal 218 to power generation circuit 204 to cause power generation circuit to provide the patterns 224 of electrical stimuli to the skin. Training circuit 206 is shown separately from control circuit 202 for illustrative purposes and is not intended to be limiting. It will be recognized that training circuit 206 may be incorporated into control circuit.

In an example embodiment, the plurality of electrically conductive elements 212 includes a grid of electrically conductive elements, as shown in FIG. 2. The grid may include any suitable number of rows (e.g., 128, 200, 256, etc.) and any suitable number of columns (e.g., 128, 200, 256, etc.). As shown in FIG. 2, X represents a spacing between adjacent electrically conductive elements along an X-axis, and Y represents a spacing between adjacent electrically conductive elements along a Y-axis. X and Y may be any suitable values, such as 3.0 millimeters (mm), 2.5 mm, 2.2 mm, 2.0 mm, 1.8 mm, 1.6 mm, 1.5 mm, and so on. X and Y may be the same or different.

In accordance with this embodiment, the one or more electrically conductive elements which are selected from the plurality of electrically conductive elements 212 have an arrangement in the grid that corresponds to (e.g., uniquely identifies) the occurrence of the event. For example, a plurality of events may have a plurality of respective arrangements in the grid. Control circuit 202 may have a map that maps each of the plurality of events to its corresponding arrangement. In accordance with this example, control circuit 202 may use the map to match the event whose occurrence is indicated by the notification signal 214 to its corresponding arrangement from the plurality of arrangements. Control circuit 202 may generate the control signal 216 to indicate the corresponding arrangement.

In another example embodiment, the control signal 216 specifies an order of the one or more electrically conductive elements based on the notification signal 214. For instance, the control signal 216 may include a numerical value for each of the one or more electrically conductive elements that corresponds to the position of that electrically conductive element in the order. Accordingly, a relatively greater numerical value may correspond to a relatively higher position in the order, and a relatively lesser numerical value may correspond to a relatively lower position in the order, or vice versa. In accordance with this embodiment, power generation circuit 204 provides the one or more electrical stimuli 222 via the one or more respective electrically conductive elements in the order based on the control signal 216.

In yet another example embodiment, the occurrence of the event includes receiving of a text-based message that includes a plurality of characters. In accordance with this embodiment, control circuit 202 generates the control signal 216 to specify a plurality of subsets of the plurality of electrically conductive elements 212 based on the notification signal 214. Each subset of the plurality of subsets corresponds to a respective character of the plurality of characters. In further accordance with this embodiment, power generation circuit 204 provides the one or more electrical stimuli via each subset of the plurality of subsets based on the control signal 216 to communicate at least a portion of the text-based message to the user.

In still another example embodiment, stimulus circuit 200 is incorporated into clothing that is worn by the user.

It will be recognized that stimulus circuit 200 may not include one or more of the components shown in FIG. 2. For instance, stimulus circuit 200 may not include any one or more of the plurality of electrically conductive elements 212, control circuit 202, power generation circuit 204, training circuit 206, measurement circuit 208, and/or skin-stimulating interface 210. Furthermore, stimulus circuit 200 may include component(s) in addition to or in lieu of those shown in FIG. 2. For instance, stimulus circuit 200 may include a store, such as a capacitor for storing charge associated with the one or more electrical stimuli 222. Such a capacitor may have any suitable capacitance, such as 200 picofarads (pF), 230 pF, 300 pF, 400 pF, and so on. The charge may be generated by body heat of the user, by motion (e.g., stretching) of fabric in clothing that includes stimulus circuit 200, or any other suitable technique. A photovoltaic cell or a button cell may be used as a source of at least a portion of the charge, though the scope of the example embodiments is not limited in this respect.

Figure 3:
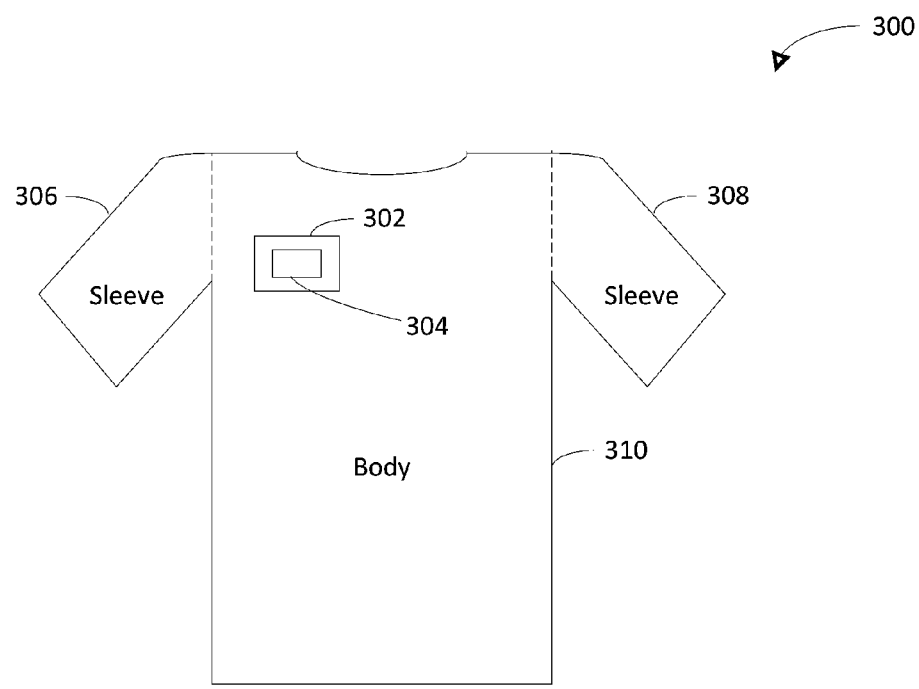
Figure 4:
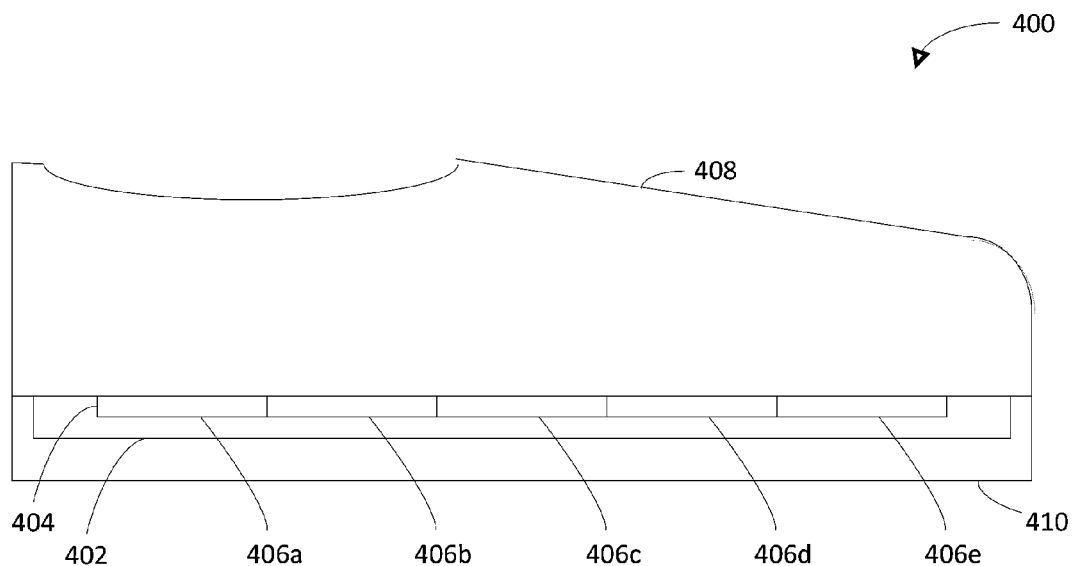

FIGS. 3 and 4 depict example uses of stimulus circuit 110 shown in FIG. 1 in accordance with embodiments. FIG. 3 shows a shirt 300 that includes a stimulus circuit 302, which is an example implementation of stimulus circuit 110. Stimulus circuit 302 includes skin-stimulating interface 304. Stimulus circuit 302 may be woven into fabric of shirt 300, adhered to shirt 300, placed in a pocket (e.g., sealable pocket) of shirt 300, adhered to the skin of the user, etc. Stimulus circuit 302 is shown to be included in a body 310 of shirt 300 for illustrative purposes, though the scope of the example embodiments is not limited in this respect. For instance, it will be recognized that stimulus circuit 302 may be included in sleeve 306 or sleeve 308.

In an example embodiment, stimulus circuit 302 is included in a back of shirt 300. For example, stimulus circuit 302 may be capable of determining that the user is slouching in a seated position. In accordance with this example, stimulus circuit 302 may detect a relatively high pressure between stimulus circuit 302 and a back of a chair in which the user is seated, meaning in this example that the user's upper back is pressing against the chair. Stimulus circuit 302 may determine that the user is slouching in the chair based on detection of the relatively high pressure.

FIG. 4 shows a shoe 400 that includes a stimulus circuit 402, which is another example implementation of stimulus circuit 110. Stimulus circuit 402 includes skin-stimulating interface 404. Stimulus circuit 402 may be woven into fabric of shoe 400, adhered to shoe 400, placed in a pocket (e.g., sealable pocket) of shoe 400, adhered to the skin of the user, etc. Stimulus circuit 402 is shown to be incorporated into a sole 410 of shoe 400 for illustrative purposes and is not intended to be limiting. It will be recognized that stimulus circuit 402 may be included in any portion of shoe 400. For instance, stimulus circuit 402 may be included in upper 408.

Skin-stimulating interface 404 includes a plurality of portions 406a-406e. Each of the portions 406a-406e is configured to electrically stimulate a respective portion of a foot of the user. The portions 406a-406e are shown to be aligned along a length of shoe 400 for illustrative purposes and are not intended to be limiting. It will be recognized that any one or more of the portions 406a-406e may be placed side-by-side or in another arrangement. For example, stimulus circuit 402 may be capable of determining that the user places more than a threshold amount of pressure on a specified portion of the foot while running, jogging, walking, etc. The threshold amount may be relative to an amount of pressure that the user places on another portion of the foot, though the scope of the example embodiments are not limited in this respect.

In accordance with this example, portion 406a of skin-stimulating interface 404 may determine a first pressure that is placed on a heel of the user's foot. Portion 406e may determine a second pressure that is placed on a ball (or toes) of the user's foot. In one aspect, stimulus circuit 402 may determine that a ratio of the first pressure to the second pressure is greater than a designated ratio. For instance, the ratio being greater than the designated ratio may indicate that the user is positioning the foot to contact the ground with too much force on the heel.

Stimulus circuit 402 may provide one or more electrical stimuli via one or more of the portions 406a-406e of skin-stimulating interface 404 to inform the user that the positioning of the foot is to be changed. For example, stimulus circuit 402 may provide the one or more electrical stimuli via portion 406a to indicate that the user is to position the foot to reduce an amount of force with which the heel contacts the ground. In another example, stimulus circuit 402 may provide the one or more electrical stimuli via portion 406e to indicate that the user is to position the foot to contact the ground with the force shifted more toward the ball (or toes) of the foot.

In another aspect, stimulus circuit 402 may determine that a ratio of the first pressure to the second pressure is less than a designated ratio. For instance, the ratio being less than the designated ratio may indicate that the user is positioning the foot to contact the ground with too much force on the ball (or toes). As mentioned above, stimulus circuit 402 may provide one or more electrical stimuli via one or more of the portions 406a-406e of skin-stimulating interface 404 to inform the user that the positioning of the foot is to be changed. For example, stimulus circuit 402 may provide the one or more electrical stimuli via portion 406e to indicate that the user is to position the foot to reduce an amount of force with which the ball (or toes) contacts the ground. In another example, stimulus circuit 402 may provide the one or more electrical stimuli via portion 406a to indicate that the user is to position the foot to contact the ground with the force shifted more toward the heel of the foot.

The discussion of the first pressure detected with respect to the heel of the foot and the second pressure detected with respect to the ball (or toes) of the foot is provided for illustrative purposes and is not intended to be limiting. It will be recognized that the first pressure and the second pressure may be detected with respect to any suitable portions of the foot. For example, a first portion of skin-stimulating interface 404 may be placed along an outer edge of the foot to detect the first pressure. A second portion of skin-stimulating interface 404 may be placed along an inner edge of the foot to detect the second pressure.

In an aspect of this example, determining that a ratio of the first pressure to the second pressure is greater than a designated ratio may indicate that the position of the foot is causing the outer edge of the foot to contact the ground with too much force. Accordingly, stimulus circuit 402 may provide one or more electrical stimuli via the first portion or the second portion of skin-stimulating interface 404 to indicate that the user is to change the position to reduce an amount of force with which the outer edge of the foot contacts the ground.

In another aspect of this example, determining that a ratio of the second pressure to the first pressure is greater than a designated ratio may indicate that the position of the foot is causing the inner edge of the foot to contact the ground with too much force. Accordingly, stimulus circuit 402 may provide one or more electrical stimuli via the first portion or the second portion of skin-stimulating interface 404 to indicate that the user is to change the position to reduce an amount of force with which the inner edge of the foot contacts the ground.

It will be recognized that stimulus circuit 402 may be included in a sock, rather than in shoe 400.

The example uses of stimulus circuit 110 shown in FIG. 1 that are depicted in FIGS. 3 and 4 are provided for illustrative purposes and are not intended to be limiting. It will be recognized that the techniques described herein for providing electrical stimuli to skin of a user to convey information to the user have any of a variety of uses. For example, stimulus circuit 110 may be configured to provide functionality of a watch. In accordance with this example, stimulus circuit 110 may be configured to provide electrical stimuli using lines of electrically conductive elements that resemble hands on the watch. Accordingly, stimulus circuit 110 may provide the electrical stimuli to indicate a time of day. Stimulus circuit 110 may be included in a band to be worn around a wrist or a forearm of the user, for example.

Figure 5:
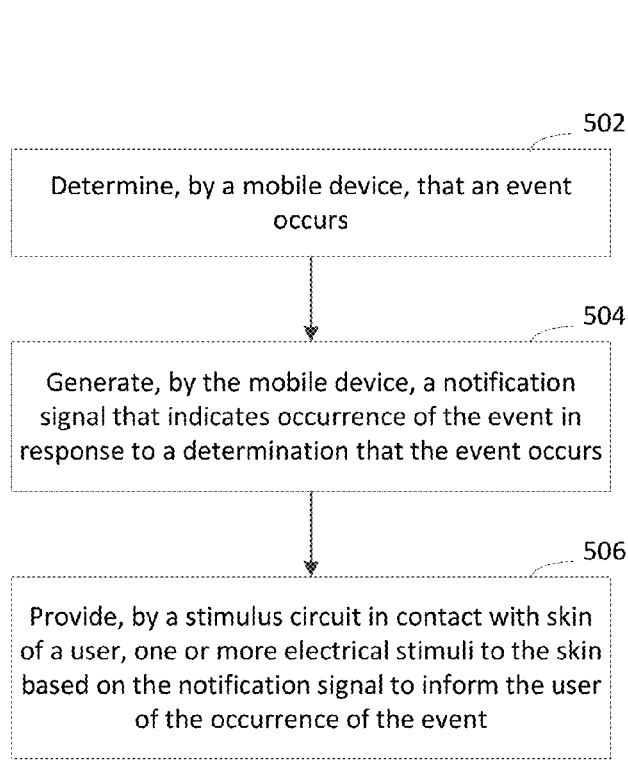

FIG. 5 depicts a flowchart 500 of an example method for providing electrical stimuli to skin of a user to convey information to the user in accordance with an embodiment. For illustrative purposes, flowchart 500 is described with respect to system 100 shown in FIG. 1 and stimulus circuit 200 shown in FIG. 2. Further structural and operational embodiments will be apparent to persons skilled in the relevant art(s) based on the discussion regarding flowchart 500.

As shown in FIG. 5, the method of flowchart 500 begins at step 502. In step 502, a determination is made by a mobile device that an event occurs. In an example implementation, mobile device 102 determines that the event occurs. For instance, event detection logic 106 may determine that the event occurs.

At step 504, a notification signal that indicates occurrence of the event is generated by the mobile device in response to a determination that the event occurs. In an example implementation, mobile device 102 generates notification signal 116 to indicate occurrence of the event. For instance, notification logic 108 may generate the notification signal 116.

At step 506, one or more electrical stimuli are provided to skin of a user, by a stimulus circuit in contact with the skin, based on the notification signal to inform the user of the occurrence of the event. In one example, the stimulus circuit may be remote from the mobile device (e.g., across a room, in another room, etc. from the mobile device). In another example, the mobile device may be on the user's person (e.g., in a pocket of the user or clipped to an article of the user's clothing). In an aspect of this example, the stimulus circuit is separated from the mobile device by a nonzero distance. It will be recognized that the mobile device may be synchronized with the stimulus circuit. In an example implementation, stimulus circuit 110 provides one or more electrical stimuli 118 to the skin of the user based on the notification signal 116.

In some example embodiments, one or more steps 502, 504, and/or 506 of flowchart 500 may not be performed. Moreover, steps in addition to or in lieu of steps 502, 504, and/or 506 may be performed. For instance, in an example embodiment, the method of flowchart 500 includes providing a control signal that specifies one or more electrically conductive elements which are selected from a plurality of electrically conductive elements based on the notification signal. For example, control circuit 202 may provide control signal 216 to specify one or more electrically conductive elements which are selected from a plurality of electrically conductive elements 212 based on the notification signal 116. The one or more electrically conductive elements may include one or more rows, one or more columns, or one or more other subsets of the plurality of electrically conductive elements 212. In accordance with this embodiment, the method of flowchart 500 further includes providing the one or more electrical stimuli via the one or more respective electrically conductive elements based on the control signal. For instance, power generation circuit 204 may provide the one or more electrical stimuli 118 via the one or more respective electrically conductive elements based on the control signal 216.

Figure 6:
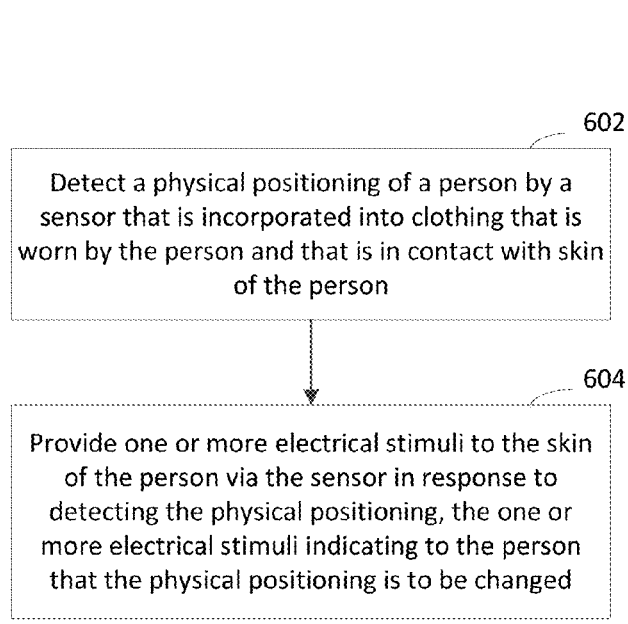
Figure 7:
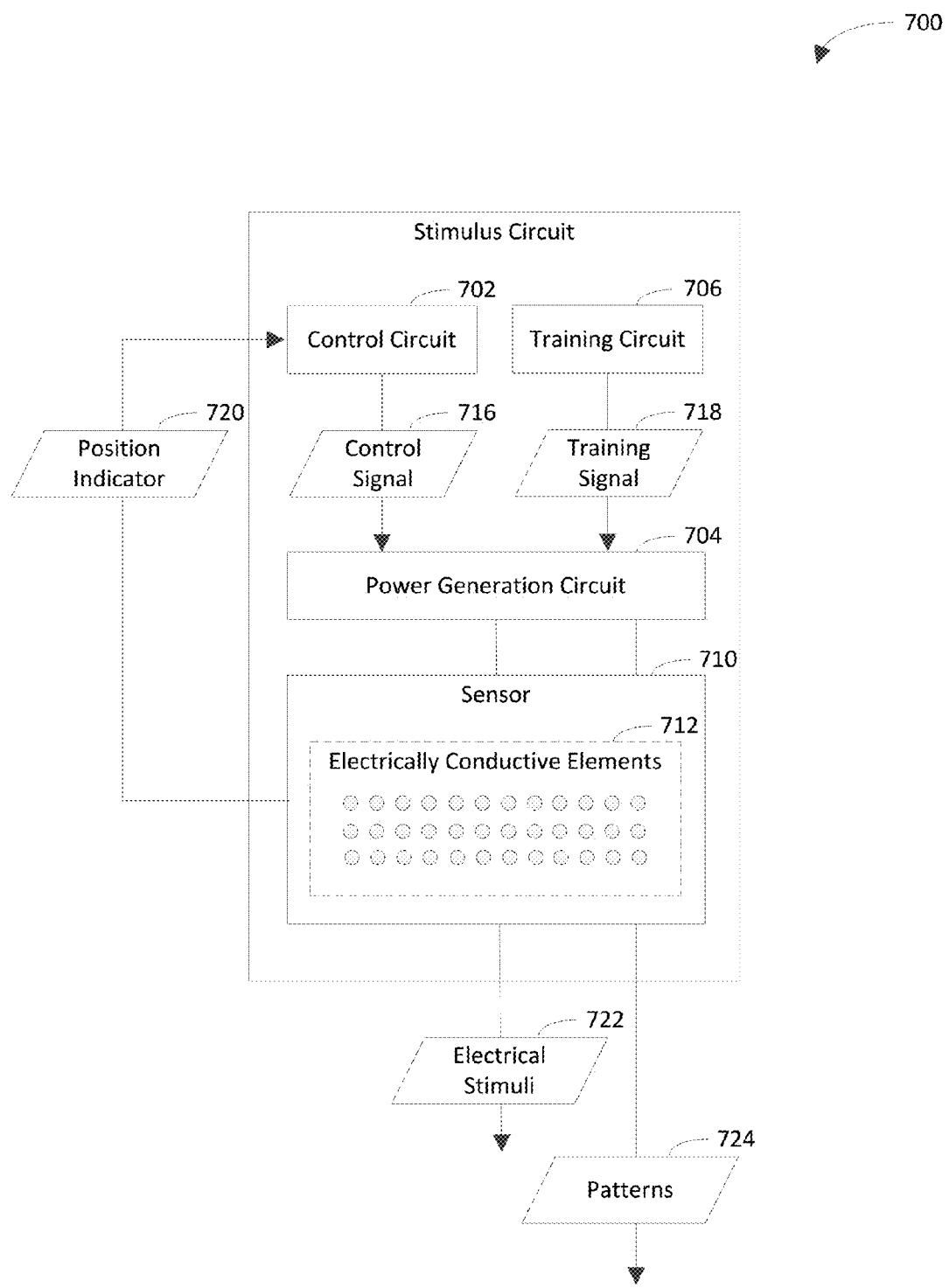

FIG. 6 depicts a flowchart of another example method for providing electrical stimuli to skin of a user to convey information to the user in accordance with an embodiment. Flowchart 600 may be performed by stimulus circuit 110 shown in FIG. 1, for example. For illustrative purposes, flowchart 600 is described with respect to stimulus circuit 700 shown in FIG. 7, which is an example of stimulus circuit 110, according to an embodiment. As shown in FIG. 7, stimulus circuit 700 includes control circuit 702, power generator circuit 704, training circuit 706, and sensor 710. Sensor 710 includes a plurality of electrically conductive elements 712. Further structural and operational embodiments will be apparent to persons skilled in the relevant art(s) based on the discussion regarding flowchart 600.

As shown in FIG. 6, the method of flowchart 600 begins at step 602. In step 602, a physical positioning of a person is detected by a sensor. The sensor is incorporated into clothing that is worn by the person, and the sensor is in contact with skin of the person. In an example implementation, sensor 710 detects the physical positioning of the person. In accordance with this implementation, sensor 710 may provide a position indicator 720 in response to detecting the physical positioning. For instance, sensor 710 may generate the position indicator 720 to indicate the physical positioning.

In an example embodiment, the plurality of conductive elements 712 (or one or more subsets thereof) sense the physical positioning of the person. The plurality of conductive elements 712 may be configured to detect pressure incident on the plurality of conductive elements 712. A relatively greater pressure incident on the plurality of conductive elements 712 (or one or more subsets thereof) may indicate contact of a body part associated with the plurality of conductive elements 712 (or the one or more subsets thereof) with a physical object (e.g., a chair, the ground, a table, etc.) or contact of the body part with the physical object with a relatively greater force. A relatively lesser pressure incident on the plurality of conductive elements 712 (or one or more subsets thereof) may indicate no contact of a body part associated with the plurality of conductive elements 712 (or the one or more subsets thereof) with a physical object or contact of the body part with the physical object with a relatively lesser force.

The embodiment above is discussed with respect to pressure for illustrative purposes and is not intended to be limiting. It will be recognized that sensor 710 may be configured to sense attributes of the environment in addition to or in lieu of pressure to detect the physical positioning of the person. In an aspect, sensor 710 may use sound, light, or other type of signal to detect the physical positioning. For instance, sensor 710 may provide a signal at a first instance of time and determine an amount of time that the signal takes to be received back at the sensor 710. The amount of time may indicate a distance of the sensor 710 (and the corresponding body part of the person) from an object that reflects the signal back to sensor 710.

At step 604, one or more electrical stimuli are provided to the skin of the person via the sensor in response to detecting the physical positioning. The one or more electrical stimuli indicate to the person that the physical positioning is to be changed. Accordingly, providing the one or more electrical stimuli to the skin may form a feedback loop with the person so that the person may make adjustments to the physical positioning based on the one or more electrical stimuli.

In an example implementation, power generation circuit 704 provides one or more electrical stimuli 722 to the skin of the person via sensor 710. For instance, control circuit 702 may select one or more electrically conductive elements from the plurality of electrically conductive elements 712 via which the one or more electrical stimuli are to be provided based on the position indicator 720. Control circuit 702 may generate control signal 716 to indicate the one or more electrical stimuli and/or the one or more electrically conductive elements via which the one or more electrical stimuli are to be provided. Power generation circuit 704 may generate the one or more electrical stimuli 722 based on the control signal 716. Power generation circuit 704 may provide the one or more electrical stimuli 722 via the one or more electrically conductive elements (e.g., and not via others of the plurality of electrically conductive elements 712) based on the control signal 716. Accordingly, power generation circuit 704 may provide the one or more electrical stimuli 722 via the one or more respective electrically conductive elements in response to selection of the one or more electrically conductive elements from the plurality of electrically conductive elements.

In an example embodiment, the one or more electrical stimuli indicate a manner in which the physical positioning is to be changed. In an aspect of this embodiment, attribute(s) of the one or more electrical stimuli (e.g., magnitude, temporal spacing therebetween, etc.) may indicate the manner in which the physical positioning is to be changed. In accordance with this aspect, power generation circuit 704 may generate the one or more electrical stimuli 722 to have the attribute(s). For instance, power generation circuit 704 may generate the one or more electrical stimuli 722 to have the attribute(s) based on the control signal 716.

In another aspect of this embodiment, the one or more stimuli may indicate that a designated part of the person's body (e.g., a torso, a lower back, a left foot, a right foot, a right hand, a left hand, a right elbow, a left elbow, a right knee, a left knee, a neck, a head, etc. of the person) is to be moved in a designated manner (e.g., straightened; bent; turned left, right, up, or down; rotated clockwise or counterclockwise, etc.). For example, if the person does not change the physical positioning in the indicated manner in response to the one or more electrical stimuli being provided, one or more additional electrical stimuli may be provided to the skin of the person via the sensor. For instance, the one or more additional electrical stimuli may be provided in response to a designated period of time passing, where the designated period of time begins at a time instance at which the one or more electrical stimuli are provided to the skin of the person. If the person changes the physical positioning in the indicated manner in response to the one or more electrical stimuli being provided, the one or more additional electrical stimuli may not be provided to the skin of the person.

In accordance with this aspect, sensor 710 may be configured to detect whether the physical positioning is changed in the indicated manner. Sensor 710 provides the position indicator 720 to control circuit 702 to indicate whether the physical positioning is changed in the indicated manner. If the position indicator 720 indicates that the physical positioning is not changed in the indicated manner, control circuit 702 may generate the control signal 716 to instruct power generation circuit 704 to provide the one or more additional electrical stimuli via sensor 710. If the position indicator 720 indicates that the physical positioning is changed in the indicated manner, control circuit 702 may not generate the control signal 716, or control circuit 702 may generate the control signal 716 to instruct power generation circuit 704 not to provide the one or more additional electrical stimuli via sensor 710.

In another example embodiment, step 602 includes detecting that the person is slouching in a seated position. For instance, the sensor may be included in an upper portion (e.g., upper half, upper third, upper quarter, or other designated region) of a back of a shirt, for example in a manner as shown in FIG. 3. The sensor may detect a relatively high pressure incident on the sensor (e.g., a pressure that exceeds a designated threshold), which may indicate that the sensor is in contact with an object (e.g., a back of a chair). Detection of the relatively high pressure may indicate that the person is leaning an upper portion of the person's back against the object. The upper portion of the person's back leaning against the object may correspond to the person slouching in a seated position. Accordingly, the sensor may detect that the person is slouching in a seated position based on detection of the relatively high pressure. In accordance with this embodiment, the one or more electrical stimuli indicate that the person is to sit upright.

In yet another example embodiment, step 602 includes detecting that the person steps with a relatively greater force on a first portion of a foot than on a second portion of the foot. For instance, the sensor may be included in a sock or a shoe, for example in a manner as shown in FIG. 4. In accordance with this embodiment, the one or more electrical stimuli indicate that the position of the foot is to be changed to reduce the force on the first portion of the foot as compared to the second portion of the foot. In an aspect of this embodiment, step 604 may include providing the one or more electrical stimuli to the skin on the first portion of the foot. In another aspect of this embodiment, step 604 may include providing the one or more electrical stimuli to the skin on the second portion of the foot.

In some example embodiments, one or more steps 602 and/or 604 of flowchart 600 may not be performed. Moreover, steps in addition to or in lieu of steps 602 and/or 604 may be performed. For instance, in an example embodiment, the method of flowchart 600 includes providing a series of patterns of electrical stimuli to the skin of the person using respective subsets of the plurality of electrically conductive elements to train the person to distinguish between the patterns. In an example implementation, power generation circuit 704 provides patterns 724 of electrical stimuli to the skin of the person. For instance, training circuit 706 may generate a training signal, which specifies the patterns 724. Power generation circuit 704 may provide the patterns 724 based on the training signal 718.

It will be recognized that stimulus circuit 700 may not include all of the components shown in FIG. 7. For instance, stimulus circuit 700 may not include one or more of the plurality of electrically conductive elements 712, control circuit 702, power generator circuit 704, training circuit 706, and/or sensor 710. Furthermore, stimulus circuit 700 may include components in addition to or in lieu of the plurality of electrically conductive elements 712, control circuit 702, power generator circuit 704, training circuit 706, and/or sensor 710.

Figure 8:
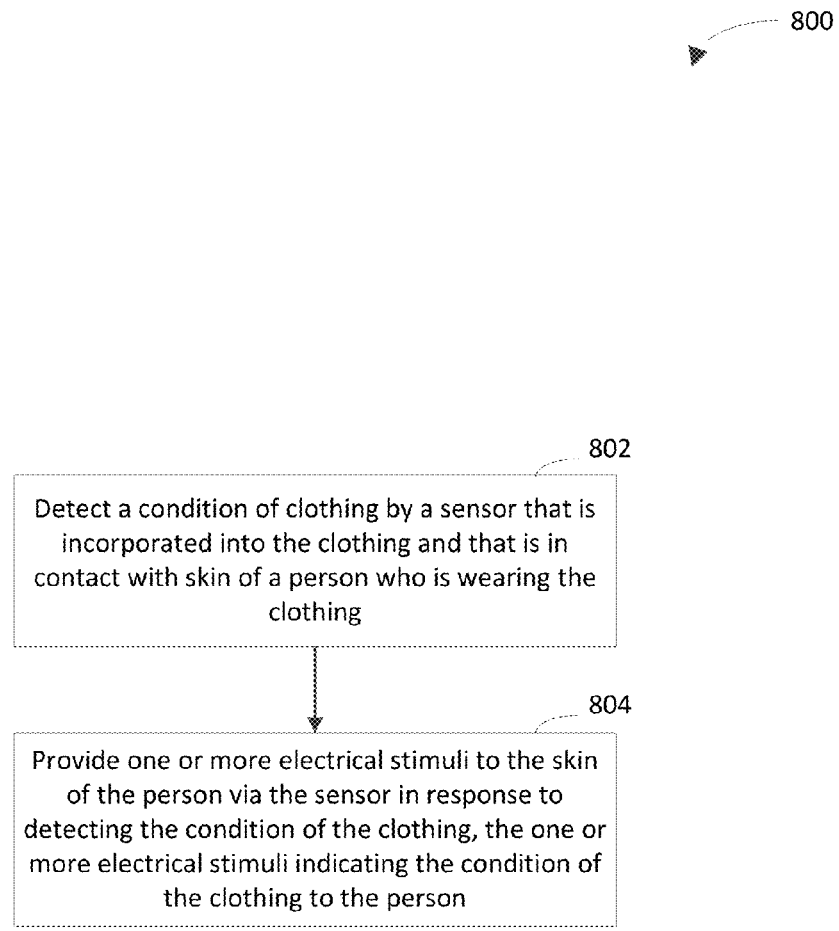
Figure 9:
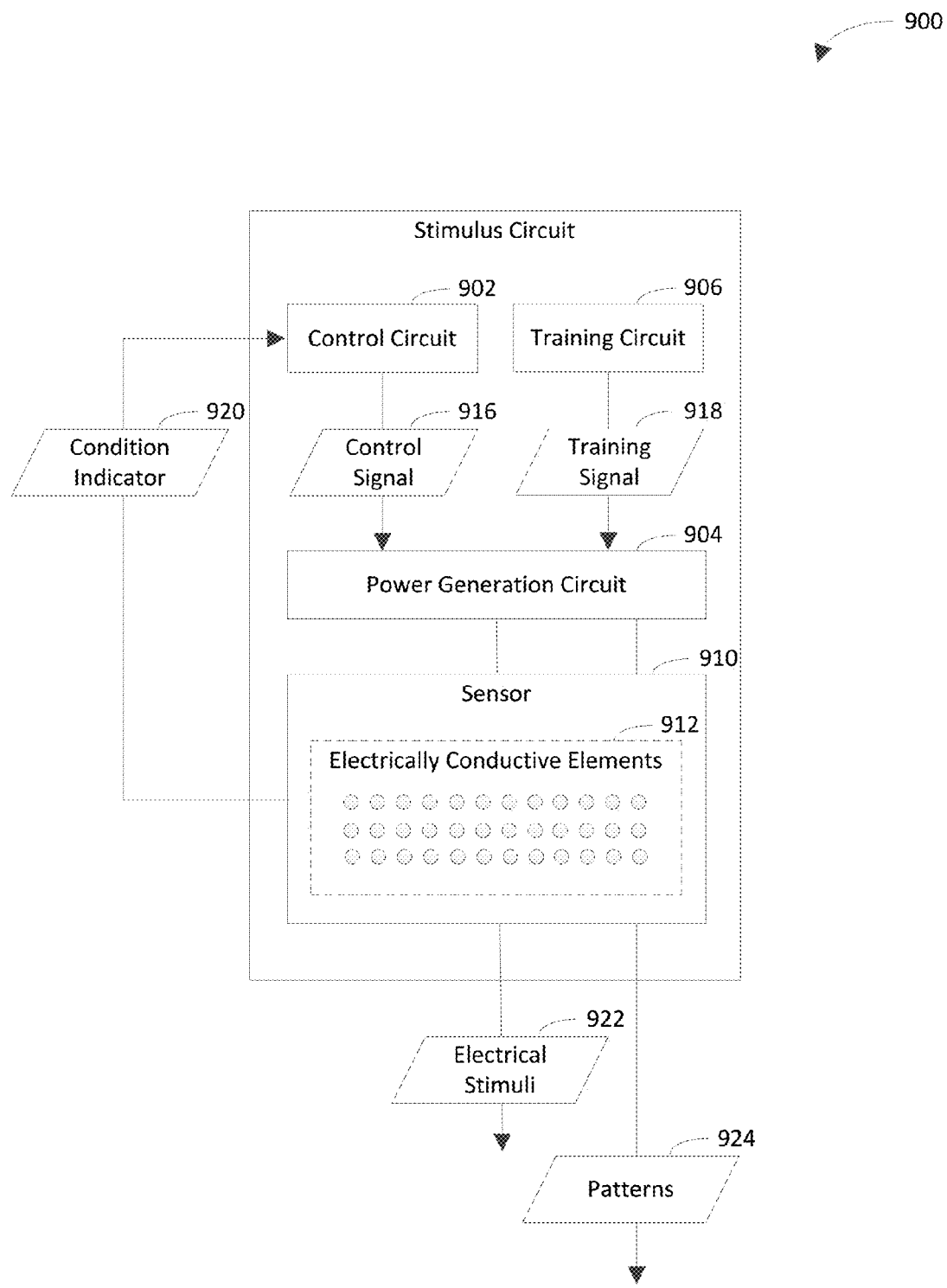

FIG. 8 depicts a flowchart of yet another example method for providing electrical stimuli to skin of a user to convey information to the user in accordance with an embodiment. Flowchart 800 may be performed by stimulus circuit 110 shown in FIG. 1, for example. For illustrative purposes, flowchart 800 is described with respect to stimulus circuit 900 shown in FIG. 9, which is another example of stimulus circuit 110, according to an embodiment. As shown in FIG. 9, stimulus circuit 900 includes control circuit 902, power generator circuit 904, training circuit 906, and sensor 910. Sensor 910 includes a plurality of electrically conductive elements 912. Further structural and operational embodiments will be apparent to persons skilled in the relevant art(s) based on the discussion regarding flowchart 800.

As shown in FIG. 8, the method of flowchart 800 begins at step 802. In step 802, a condition of clothing is detected by a sensor that is incorporated into the clothing and that is in contact with skin of a person who is wearing the clothing. In an example implementation, sensor 910 detects the condition of the clothing. In accordance with this implementation, sensor 910 may provide a condition indicator 920 in response to detecting the condition of the clothing. For instance, sensor 910 may generate the condition indicator 920 to indicate the condition of the clothing.

In an example embodiment, the plurality of conductive elements 912 (or one or more subsets thereof) sense the condition of the clothing. For example, the plurality of conductive elements 912 (or one or more subsets thereof) may sense that the clothing is dirty, wet, and/or damaged. In accordance with this example, the plurality of conductive elements 912 may be configured to detect moisture and/or pressure incident on the plurality of conductive elements 912. In an aspect, moisture incident on the plurality of conductive elements 912 (or the one or more subsets thereof) may indicate that the clothing is wet.

In another aspect, a relatively greater pressure incident on the plurality of conductive elements 912 (or one or more subsets thereof) may indicate that the clothing is in contact with the plurality of conductive elements 912 (or the one or more subsets thereof). Sensor 910 may determine that the clothing is not damaged in response to detecting the relatively greater pressure. A relatively lesser pressure incident on the plurality of conductive elements 912 (or one or more subsets thereof) may indicate that the clothing is not in contact with the plurality of conductive elements 912 (or the one or more subsets thereof). Sensor 910 may determine that the clothing is damaged (e.g., is ripped or torn) in response to detecting the relatively lesser pressure.

In yet another aspect, a relatively greater pressure incident on the plurality of conductive elements 912 (or one or more subsets thereof) may indicate that a substance (e.g., dirt) is associated with (e.g., attached to and/or incorporated into) fibers of the clothing. For instance, the substance may be pressing against the plurality of conductive elements 912 (or the one or more subsets thereof), resulting in the relatively greater pressure. Sensor 910 may determine that the clothing is dirty in response to detecting the relatively greater pressure. A relatively lesser pressure incident on the plurality of conductive elements 912 (or one or more subsets thereof) may indicate that the clothing is not dirty. For instance, the fibers of the clothing not being associated with a substance may result in the relatively lesser pressure.

The embodiment above is discussed with respect to moisture and pressure for illustrative purposes and is not intended to be limiting. It will be recognized that sensor 910 may be configured to sense attributes of the environment in addition to or in lieu of moisture and/or pressure to detect the condition of the clothing. In an aspect, sensor 910 may use sound, light, or other type of signal to detect the condition of the clothing. For instance, sensor 910 may provide a signal at a first instance of time and determine an amount of time that the signal takes to be received back at the sensor 910. The amount of time may indicate whether water and/or another substance (e.g., dirt) is incident on the plurality of conductive elements 912 (or the one or more subsets thereof) and/or associated with fibers of the clothing. For example, a relatively greater amount of time (e.g., an amount of time greater than a designated threshold) may indicate that water and/or another substance is incident on the plurality of conductive elements 912 (or the one or more subsets thereof) and/or associated with fibers of the clothing. A relatively lesser amount of time (e.g., an amount of time less than a designated threshold) may indicate that water and/or another substance is not incident on the plurality of conductive elements 912 (or the one or more subsets thereof) and/or not associated with fibers of the clothing.

At step 804, one or more electrical stimuli are provided to the skin of the person via the sensor in response to detecting the condition of the clothing. The one or more electrical stimuli indicate the condition of the clothing to the person. In an example implementation, power generation circuit 904 provides one or more electrical stimuli 922 to the skin of the person via sensor 910.

For instance, control circuit 902 may select one or more electrically conductive elements from the plurality of electrically conductive elements 912 via which the one or more electrical stimuli are to be provided based on the condition indicator 920. Control circuit 902 may generate control signal 916 to indicate the one or more electrical stimuli and/or the one or more electrically conductive elements via which the one or more electrical stimuli are to be provided. Power generation circuit 904 may generate the one or more electrical stimuli 922 based on the control signal 916. Power generation circuit 904 may provide the one or more electrical stimuli 922 via the one or more electrically conductive elements (e.g., and not via others of the plurality of electrically conductive elements 912) based on the control signal 916. Accordingly, power generation circuit 904 may provide the one or more electrical stimuli 922 via the one or more respective electrically conductive elements in response to selection of the one or more electrically conductive elements from the plurality of electrically conductive elements.

In some example embodiments, one or more steps 802 and/or 804 of flowchart 800 may not be performed. Moreover, steps in addition to or in lieu of steps 802 and/or 804 may be performed. For instance, in an example embodiment, step 802 includes identifying the condition from a plurality of conditions. In accordance with this embodiment, the method of flowchart 800 includes selecting an attribute of the one or more electrical stimuli from a plurality of attributes that correspond to the plurality of respective conditions. For instance, control circuit 902 may select the attribute from the plurality of attributes based on the condition indicator 920. Control circuit 902 may generate the control signal 916 to indicate the attribute which is selected from the plurality of attributes. In further accordance with this embodiment, step 804 includes providing the one or more electrical stimuli having the attribute in response to selecting the attribute from the plurality of attributes. For instance, power generation circuit 904 may provide the one or more electrical stimuli 922 having the attribute based on the control signal 916.

In another example embodiment, the method of flowchart 800 includes providing a series of patterns of electrical stimuli to the skin of the person using respective subsets of the plurality of electrically conductive elements to train the person to distinguish between the patterns. In an example implementation, power generation circuit 904 provides patterns 924 of electrical stimuli to the skin of the person. For instance, training circuit 906 may generate a training signal, which specifies the patterns 924. Power generation circuit 904 may provide the patterns 924 based on the training signal 918.

It will be recognized that stimulus circuit 900 may not include all of the components shown in FIG. 9. For instance, stimulus circuit 900 may not include one or more of the plurality of electrically conductive elements 912, control circuit 902, power generator circuit 904, training circuit 906, and/or sensor 910. Furthermore, stimulus circuit 900 may include components in addition to or in lieu of the plurality of electrically conductive elements 912, control circuit 902, power generator circuit 904, training circuit 906, and/or sensor 910.

Figure 10:
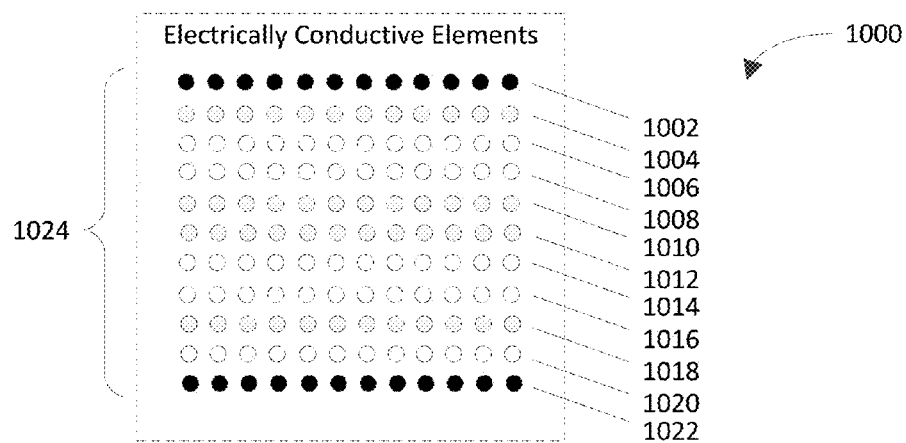
FIGS. 10-12 depict example configurations of electrically conductive elements shown in FIGS. 2, 7, and 9 in accordance with embodiments.
Figure 11:
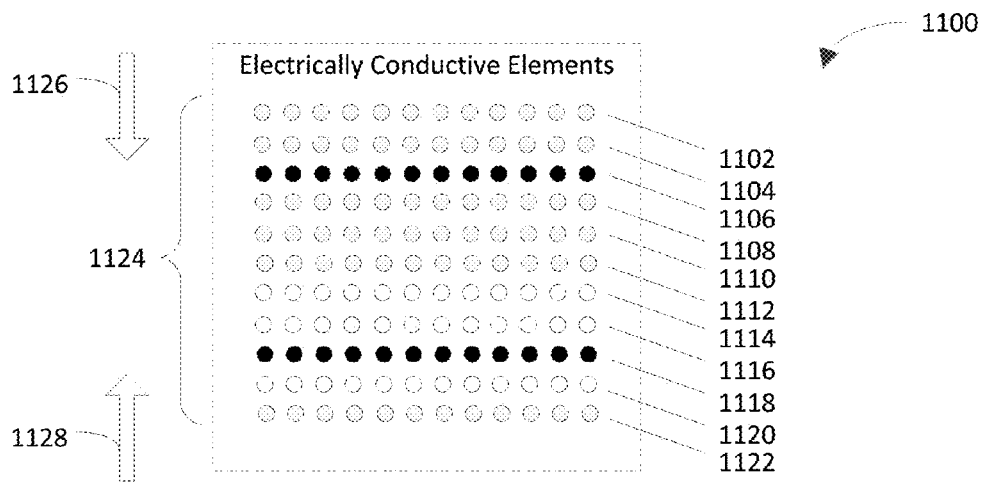
Figure 12:
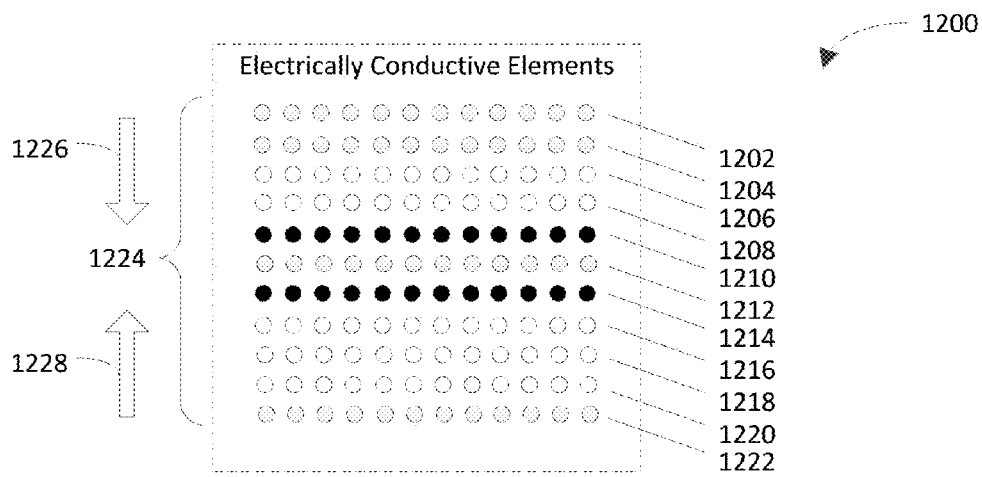

FIGS. 10-12 depict example configurations 1000, 1100, and 1200 of electrically conductive elements shown in FIGS. 2, 7, and 9 in accordance with embodiments. In the configurations 1000, 1100, and 1200, respective subsets of the electrically conductive elements are used to provide respective patterns 1024, 1124, and 1224 of electrical stimuli to skin of a person. For instance, providing the patterns 1024, 1124, and 1224 of electrical stimuli to the skin of the person may be performed in accordance with a training operation to train the person to distinguish between the patterns 1024, 1124, and 1224. Each of the patterns 1024, 1124, and 1224 may be provided to the skin of the person independently from others of the patterns 1024, 1124, 1224 or in combination with one or more others of the patterns 1024, 1124, and 1224.

As shown in FIG. 10, configuration 1000 includes rows 1002, 1004, 1006, 1008, 1010, 1012, 1014, 1016, 1018, 1020, and 1022 of electrically conductive elements. The electrically conductive elements in rows 1002 and 1022 are represented as filled circles to indicate that an electrical stimulus is provided via each of the electrically conductive elements in rows 1002 and 1022. The electrically conductive elements in rows 1004, 1006, 1008, 1010, 1012, 1014, 1016, 1018, and 1020 are represented as unfilled circles to indicate that an electrical stimulus is not provided via each of the electrically conductive elements in these rows.

As shown in FIG. 11, configuration 1100 includes rows 1102, 1104, 1106, 1108, 1110, 1112, 1114, 1116, 1118, 1120, and 1122 of electrically conductive elements. The electrically conductive elements in rows 1106 and 1118 are represented as filled circles to indicate that an electrical stimulus is provided via each of the electrically conductive elements in rows 1106 and 1118. The electrically conductive elements in rows 1102, 1104, 1108, 1110, 1112, 1114, 1116, 1120, and 1122 are represented as unfilled circles to indicate that an electrical stimulus is not provided via each of the electrically conductive elements in these rows. Arrows 1126 and 1128 indicate that the electrical stimuli are provided by rows that are successively closer together in arrangement 1124, as compared to arrangement 1024 of FIG. 10.

As shown in FIG. 12, configuration 1200 includes rows 1202, 1204, 1206, 1208, 1210, 1212, 1214, 1216, 1218, 1220, and 1222 of electrically conductive elements. The electrically conductive elements in rows 1210 and 1214 are represented as filled circles to indicate that an electrical stimulus is provided via each of the electrically conductive elements in rows 1210 and 1214. The electrically conductive elements in rows 1202, 1204, 1206, 1208, 1212, 1216, 1218, 1220, and 1222 are represented as unfilled circles to indicate that an electrical stimulus is not provided via each of the electrically conductive elements in these rows. Arrows 1226 and 1228 indicate that the electrical stimuli are provided by rows that are successively closer together in arrangement 1224, as compared to arrangement 1124 of FIG. 11.

It will be recognized that patterns 1024, 1124, and 1224 in respective FIGS. 10, 11, and 12 may be provided sequentially to the skin of the user to form a sequential pattern. Such a sequential pattern may be referred to as a moving pattern because the rows via which the electrical stimuli are provided appear to move in each successive pattern.

The patterns described above with reference to FIGS. 10, 11, and 12 are provided for illustrative purposes and are not intended to be limiting. It will be recognized that any suitable pattern of electrical stimuli may be provided to the skin of the person. For instance, the patterns in FIGS. 10, 11, and 12 are shown to be provided using row(s) of electrically conductive elements. It will be recognized that patterns may be provided using column(s) of electrically conductive elements, cross(es) (i.e., row(s) and column(s)) of electrically conductive elements, and/or other configurations.

The training techniques described herein may cause the skin of the person to whom the patterns are provided to become sensitive enough that the person is able to distinguish between the patterns. For instance, the training techniques may cause a number of nerve endings associated with the skin (or portion(s) thereof to which the patterns are provided) to increase.

Any one or more of mobile device 102, wearable computer 104, event detection logic 106, notification logic 108, stimulus circuit 110, skin-stimulating interface 112, control circuit 202, power generation circuit 204, training circuit 206, measurement circuit 208, skin-stimulating interface 210, stimulus circuit 302, skin-stimulating interface 304, stimulus circuit 402, skin-stimulating interface 404, control circuit 702, power generation circuit 704, training circuit 706, sensor 710, control circuit 902, power generation circuit 904, training circuit 906, sensor 910, flowchart 500, flowchart 600, and/or flowchart 800 may be implemented in hardware, software, firmware, or any combination thereof.

For example, any one or more of mobile device 102, wearable computer 104, event detection logic 106, notification logic 108, stimulus circuit 110, skin-stimulating interface 112, control circuit 202, power generation circuit 204, training circuit 206, measurement circuit 208, skin-stimulating interface 210, stimulus circuit 302, skin-stimulating interface 304, stimulus circuit 402, skin-stimulating interface 404, control circuit 702, power generation circuit 704, training circuit 706, sensor 710, control circuit 902, power generation circuit 904, training circuit 906, sensor 910, flowchart 500, flowchart 600, and/or flowchart 800 may be implemented as computer program code configured to be executed in one or more processors.

In another example, any one or more of mobile device 102, wearable computer 104, event detection logic 106, notification logic 108, stimulus circuit 110, skin-stimulating interface 112, control circuit 202, power generation circuit 204, training circuit 206, measurement circuit 208, skin-stimulating interface 210, stimulus circuit 302, skin-stimulating interface 304, stimulus circuit 402, skin-stimulating interface 404, control circuit 702, power generation circuit 704, training circuit 706, sensor 710, control circuit 902, power generation circuit 904, training circuit 906, sensor 910, flowchart 500, flowchart 600, and/or flowchart 800 may be implemented as hardware logic/electrical circuitry.

For instance, in an embodiment, one or more of mobile device 102, wearable computer 104, event detection logic 106, notification logic 108, stimulus circuit 110, skin-stimulating interface 112, control circuit 202, power generation circuit 204, training circuit 206, measurement circuit 208, skin-stimulating interface 210, stimulus circuit 302, skin-stimulating interface 304, stimulus circuit 402, skin-stimulating interface 404, control circuit 702, power generation circuit 704, training circuit 706, sensor 710, control circuit 902, power generation circuit 904, training circuit 906, sensor 910, flowchart 500, flowchart 600, and/or flowchart 800 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 13:
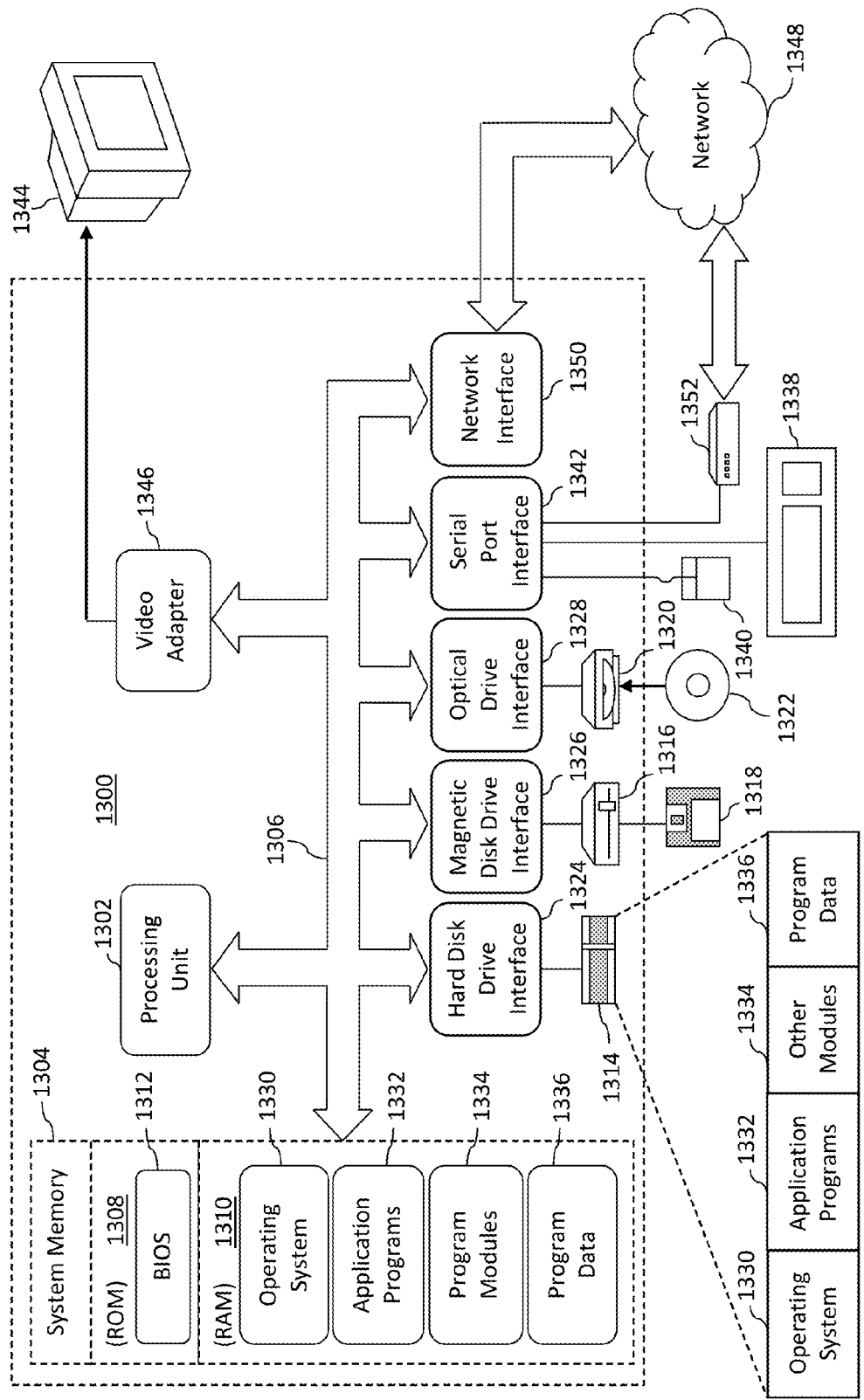
FIG. 13 depicts an example computer in which embodiments may be implemented.

FIG. 13 depicts an example computer 1300 in which embodiments may be implemented. For instance, any of mobile device 102 and/or wearable computer 104 shown in FIG. 1 may be implemented using computer 1300, including one or more features of computer 1300 and/or alternative features. Computer 1300 may be a general-purpose computing device in the form of a conventional personal computer, a mobile computer, or a workstation, for example, or computer 1300 may be a special purpose computing device. The description of computer 1300 provided herein is provided for purposes of illustration, and is not intended to be limiting. Embodiments may be implemented in further types of computer systems, as would be known to persons skilled in the relevant art(s).

As shown in FIG. 13, computer 1300 includes a processing unit 1302, a system memory 1304, and a bus 1306 that couples various system components including system memory 1304 to processing unit 1302. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computer 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1330, one or more application programs 1332, other program modules 1334, and program data 1336. Application programs 1332 or program modules 1334 may include, for example, computer program logic for implementing any one or more of event detection logic 106, notification logic 108, stimulus circuit 110, skin-stimulating interface 112, control circuit 202, power generation circuit 204, training circuit 206, measurement circuit 208, skin-stimulating interface 210, stimulus circuit 302, skin-stimulating interface 304, stimulus circuit 402, skin-stimulating interface 404, control circuit 702, power generation circuit 704, training circuit 706, sensor 710, control circuit 902, power generation circuit 904, training circuit 906, sensor 910, flowchart 500 (including any step of flowchart 500), flowchart 600 (including any step of flowchart 600), and/or flowchart 800 (including any step of flowchart 800), as described herein.

A user may enter commands and information into the computer 1300 through input devices such as keyboard 1338 and pointing device 1340. Other input devices (not shown) may include a microphone, joystick, game pad, satellite dish, scanner, touch screen, camera, accelerometer, gyroscope, or the like. These and other input devices are often connected to the processing unit 1302 through a serial port interface 1342 that is coupled to bus 1306, but may be connected by other interfaces, such as a parallel port, game port, or a universal serial bus (USB).

A display device 1344 (e.g., a monitor) is also connected to bus 1306 via an interface, such as a video adapter 1346.

In addition to display device 1344, computer 1300 may include other peripheral output devices (not shown) such as speakers and printers.

Computer 1300 is connected to a network 1348 (e.g., the Internet) through a network interface or adapter 1350, a modem 1352, or other means for establishing communications over the network. Modem 1352, which may be internal or external, is connected to bus 1306 via serial port interface 1342.

As used herein, the terms "computer program medium" and "computer-readable storage medium" are used to generally refer to media such as the hard disk associated with hard disk drive 1314, removable magnetic disk 1318, removable optical disk 1322, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1332 and other program modules 1334) may be stored on the hard disk, magnetic disk, optical disk, ROM, or RAM. Such computer programs may also be received via network interface 1350 or serial port interface 1342. Such computer programs, when executed or loaded by an application, enable computer 1300 to implement features of embodiments discussed herein. Accordingly, such computer programs represent controllers of the computer 1300.

Example embodiments are also directed to computer program products comprising software (e.g., computer-readable instructions) stored on any computer-useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technology is not limited to any particular computer or type of hardware. Certain details of suitable computers and hardware are well known and need not be set forth in detail in this disclosure.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A system comprising:
a mobile device configured to determine whether an event occurs, the mobile device further configured to generate a notification signal that indicates occurrence of the event in response to a determination that the event occurs; and
a stimulus circuit in contact with skin of a user, the stimulus circuit configured to provide one or more electrical stimuli that have substantially no amperage to the skin based on the notification signal to inform the user of the occurrence of the event.

2. The system of claim 1, wherein the occurrence of the event comprises receipt of at least one of a text-based message, a voicemail, or a phone call at the mobile device.

3. The system of claim 1, wherein the stimulus circuit comprises:
a plurality of electrically conductive elements;
a control circuit configured to provide a control signal that specifies one or more electrically conductive elements which are selected from the plurality of electrically conductive elements based on the notification signal; and
a power generation circuit configured to provide the one or more electrical stimuli via the one or more respective electrically conductive elements based on the control signal.

4. The system of claim 3, wherein the plurality of electrically conductive elements includes a grid of electrically conductive elements; and
wherein the one or more electrically conductive elements have an arrangement in the grid that corresponds to the occurrence of the event.

5. The system of claim 3, wherein the control signal specifies an order of the one or more electrically conductive elements based on the notification signal; and
wherein the power generation circuit is configured to provide the one or more electrical stimuli via the one or more respective electrically conductive elements in the order based on the control signal.

6. The system of claim 3, wherein the power generation circuit is configured to adapt an amplitude of the one or more electrical stimuli based on an electrical resistance of the skin.

7. The system of claim 6, further comprising:
a measurement circuit configured to detect the electrical resistance of the skin;
wherein the control signal further specifies a designated amplitude of the one or more electrical stimuli based on the electrical resistance of the skin; and
wherein the power generation circuit is configured to provide the one or more electrical stimuli having the designated amplitude based the control signal.

8. The system of claim 3, wherein the control circuit is further configured to perform a training operation during which the control circuit controls the power generation circuit to provide a series of patterns of electrical stimuli to the skin of the user to train the user to distinguish between the patterns.

9. The system of claim 1, wherein the occurrence of the event comprises receipt of a text-based message that includes a plurality of characters; and
wherein the stimulus circuit comprises:
a plurality of electrically conductive elements;
a control circuit configured to provide a control signal that specifies a plurality of subsets of the plurality of electrically conductive elements based on the notification signal, each subset of the plurality of subsets corresponding to a respective character of the plurality of characters; and
a power generation circuit configured to provide one or more electrical stimuli via each subset of the plurality of subsets based on the control signal to communicate at least a portion of the text-based message to the user.

10. The system of claim 1, wherein the stimulus circuit is incorporated into clothing that is worn by the user.

11. A method of providing electrical stimuli to skin of a user to convey information to the user, the method comprising:
determining, using a processor of a mobile device, whether an event occurs;
generating, using the processor of the mobile device, a notification signal that indicates occurrence of the event in response to determining that the event occurs; and
providing one or more electrical stimuli that have substantially no amperage to skin of a user, by a stimulus circuit that is in contact with the skin, based on the notification signal to inform the user of the occurrence of the event.

12. The method of claim 11, wherein the occurrence of the event comprises receipt of at least one of a text-based message, a voicemail, or a phone call at the mobile device.

13. The method of claim 11, further comprising:
providing, by the stimulus circuit, a control signal that specifies one or more electrically conductive elements that are selected from a plurality of electrically conductive elements based on the notification signal;
wherein providing the one or more electrical stimuli comprises:
providing the one or more electrical stimuli to the skin, by the stimulus circuit, via the one or more respective electrically conductive elements based on the control signal.

14. The method of claim 13, wherein providing the control signal comprises:
providing the control signal that specifies the one or more electrically conductive elements that are selected from the plurality of electrically conductive elements that includes a grid of electrically conductive elements, the one or more electrically conductive elements having an arrangement in the grid that corresponds to the occurrence of the event.

15. The method of claim 13, wherein providing the control signal comprises:
providing the control signal that specifies an order of the one or more electrically conductive elements based on the notification signal; and
wherein providing the one or more electrical stimuli comprises:
providing the one or more electrical stimuli via the one or more respective electrically conductive elements in the order based on the control signal.

16. The method of claim 13, further comprising:
adapting an amplitude of the one or more electrical stimuli based on an electrical resistance of the skin.

17. The method of claim 16, further comprising:
detecting the electrical resistance of the skin;
wherein providing the control signal comprises:
  providing the control signal that further specifies a designated amplitude of the one or more electrical stimuli based on the electrical resistance of the skin; and
wherein providing the one or more electrical stimuli comprises:
  providing the one or more electrical stimuli having the designated amplitude based the control signal.

18. The method of claim 13, further comprising:
performing a training operation during which a series of patterns of electrical stimuli is provided to the skin of the user to train the user to distinguish between the patterns.

19. The method of claim 11, wherein the occurrence of the event comprises receipt of a text-based message that includes a plurality of characters;
wherein the method further comprises:
  providing a control signal that specifies a plurality of subsets of a plurality of electrically conductive elements based on the notification signal, each subset of the plurality of subsets corresponding to a respective character of the plurality of characters; and
wherein providing the one or more electrical stimuli comprises:
  providing one or more electrical stimuli via each subset of the plurality of subsets based on the control signal to communicate at least a portion of the text-based message to the user.

20. A computer program product comprising a computer-readable device having computer program logic recorded thereon for enabling a processor-based system to provide electrical stimuli to skin of a user to convey information to the user, the computer program logic comprising:
  a first program logic module for enabling the processor-based system to determine whether an event occurs;
  a second program logic module for enabling the processor-based system to generate a notification signal that indicates occurrence of the event in response to a determination that the event occurs; and
  a third program logic module for enabling the processor-based system to provide one or more electrical stimuli that have substantially no amperage to skin of a user via a stimulus circuit that is in contact with the skin based on the notification signal to inform the user of the occurrence of the event.

* * * * *